Figure 1:
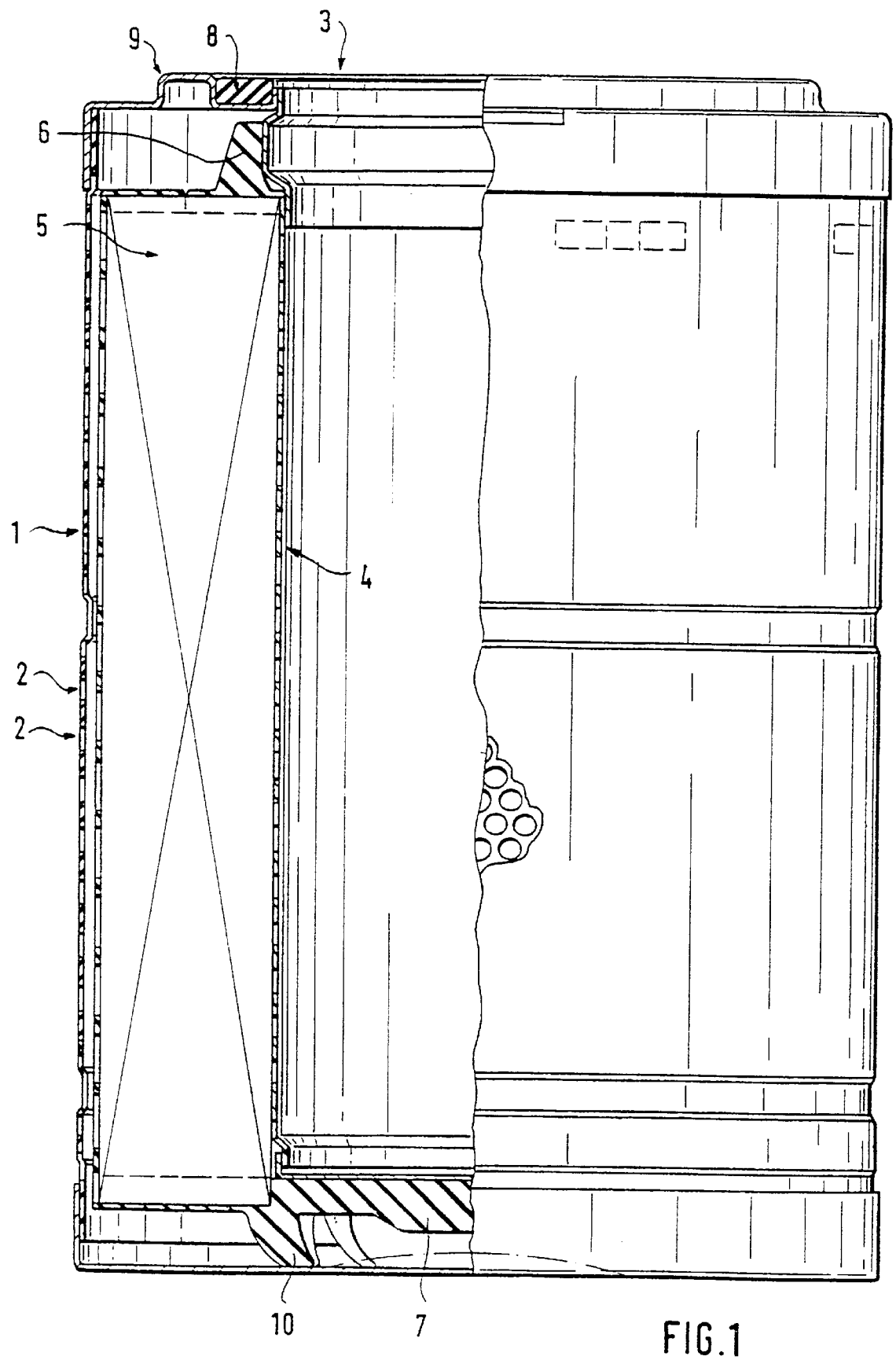

United States Patent [19]
Moessinger et al.

[11] Patent Number: 6,090,177
[45] Date of Patent: Jul. 18, 2000

[54] AIR FILTER ELEMENT WITH A CONTROL TUBE AND DIVIDED HOUSING

[75] Inventors: Klaus Moessinger, Obersulm II; Ulrich Wittel, Remseck; Hans Erdmannsdoerfer, Dobel, all of Germany

[73] Assignee: Filterwerk Mann & Hummel GmbH, Ludwigsburg, Germany

[21] Appl. No.: 09/091,548

[22] PCT Filed: Nov. 20, 1996

[86] PCT No.: PCT/EP96/05103

§ 371 Date: Mar. 9, 1999

§ 102(e) Date: Mar. 9, 1999

[87] PCT Pub. No.: WO97/22795

PCT Pub. Date: Jun. 26, 1997

[30] Foreign Application Priority Data

Dec. 20, 1995 [DE] Germany ............................ 195 47 575

[51] Int. Cl.[7] ............................ B01D 27/06; B01D 27/08
[52] U.S. Cl. ............................ 55/498; 55/502; 55/503
[58] Field of Search ............................ 55/490, 495, 497, 55/498, 500, 502, 503, 385.3

[56] References Cited

U.S. PATENT DOCUMENTS

| | | | |
|---|---|---|---|
| 5,556,542 | 9/1996 | Berman et al. | 210/232 |
| 5,685,985 | 11/1997 | Brown et al. | 55/498 |
| 5,730,769 | 3/1998 | Dungs et al. | 55/498 |

*Primary Examiner*—David A. Simmons
*Assistant Examiner*—Robert A. Hopkins
*Attorney, Agent, or Firm*—Evenson, McKeown, Edwards & Lenahan, P.L.L.C.

[57] ABSTRACT

An air filter element, in particular for the cleaning of combustion air for internal combustion engines, in air filters with a substantially cylindrical, air-permeable housing. The air filter element has a raw air inlet area (2) and a clean air outlet area (3). The clean air outlet area is arranged substantially concentrically on one of the end surfaces of the cylindrical housing (1), and the raw air inlet area occurs substantially across the surface of the housing (1). An air-permeable center tube (4) connecting to the clean air outlet area extends inside the housing (1), and a substantially metal-free filter insert (5) is slid over the center tube (4) and separates the clean air from the raw air side. The opposite end surface (7) of the insert is sealed, and the clean air outlet side of the housing (1) has an axial seal (8) on the face thereof, it being possible to divide the housing (1).

9 Claims, 2 Drawing Sheets

AIR FILTER ELEMENT WITH A CONTROL TUBE AND DIVIDED HOUSING

The invention relates to an air filter element, especially for cleaning combustion air for internal combustion engines in air filters.

Such air filter elements are known, for example due to their use in commercial vehicles, especially in dusty country.

Air filter elements known heretofore are replaced after a certain time of operation. Depending on the amount of dust, the useful life of an air filter can amount to a few days or as much as several months. Usually, known filter inserts consist of a combination of materials, sheet steel being used especially for the supporting tubes. The actual filter medium is paper or synthetic fleece which in itself is not able to withstand the forces caused by pulsation in internal combustion engines. Disposal of such air filter elements by separating them into their components entails great effort and is therefore uneconomical and expensive.

According to the "Technische Anleitung Abfall" [technical guidelines on wastes] governing waste disposal in the Federal Republic of Germany, the reduction of waste takes priority over waste recycling and disposal. In waste recycling it is required that recycling be technically possible, the cost of the recycling be reasonable, and that a market exist or can be created for the materials or energy. Until these criteria are satisfied the wastes must be properly disposed of.

In the case of air filter elements, recycling has been difficult on account of the disadvantages described.

The invention is thus addressed to the problem of improving an air filter element of the kind described above such that the use of essentially metal-free filter inserts, which do not have to be suitable for withstanding forces, will be possible in connection with the recycling of the rest of its parts.

This problem is solved according to the invention in that the cylindrical housing of the air filter element is permeable to air, the air filter element has a raw air inlet 2 and a clean air outlet 3, the clean air outlet is substantially concentric with one of the ends of the cylindrical housing and the raw air admission occurs substantially through the mantle surface of the housing, while a central air tube extends in the interior of the housing and communicates with the clean air outlet. An essentially metal-free filter insert is inserted through the center tube which separates the clean air side from the raw air side, its opposite end being closed; the clean air outlet end of the housing has an axial gasket on top of it, and the housing is divisible.

An advantageous embodiment provides for the central tube to be joined to one half of the housing. Installation and removal is facilitated by this one-piece construction. The operation of placing the filter insert on the central tube followed by installation in the housing is simplified, since it is no longer necessary to center the filter insert.

Another advantageous embodiment provides for the filter insert to be releasably joined to the central tube. This has the advantage, for one thing, that when the used-up filter insert is disposed of, only the insert needs to be replaced, which shifts the use of materials to the replacement part side. On the other hand, this also reduces the amount of material to be disposed of. The result is a replacement part that is, for example, metal-free.

Another advantageous embodiment provides for the end of the filter insert facing the clean air outlet to be given a sealing bead, the sealing bead being sealingly in contact with the surface of the central tube and forming a radial seal. Upon insertion into the housing the filter insert comes automatically into the correct installed position due to the axially tolerant seal to the central tube. Furthermore, this easily flexible design of the filter insert is capable of absorbing any shock pressures without damage.

In another advantageous embodiment provision is made for the end of the filter insert facing the clean air outlet to be given a sealing bead, the bead being in sealing contact with the end of the housing half and forming an axial seal. Due to the special configuration of the seal, so that it can assume axial sealing properties if the length of the filter insert is correct, the assurance is given that in case of a shock pressure the filtering properties remain intact.

Another advantageous embodiment provides a safety cartridge within the central tube, with its end opposite the clean air outlet closed and releasably joined to the central tube. This safety cartridge provides safe filter operation; its releasability, as in the case of the filter insert, allows easier handling as regards insertion and disposal.

Another advantageous embodiment provides for the filter insert to consist of a pleated paper or nonwoven material and for the end plates as well as the sealing bead to be made of PUR foam. This combination of materials has advantages in case of shock pressures such that no damage will be done to the filter insert.

One advantageous embodiment provides that the air filter element be fastened by a snap-fastening means capable of binding the housing halves together and connected to the cover or housing by a film hinge or metal hinge. By means of this the housing parts can be fastened together quickly and easily.

In another advantageous embodiment the parts of the air filter element that do not belong to the filter insert are reusable. On account of this reusability of the peripheral parts the life of the product is increased and the amount of waste is thus reduced.

Another advantageous embodiment provides that the reusable parts consist of metal and/or plastic. This has the advantage that even in the event these peripheral parts are recycled they will be in the same class, and both substances are relatively easy to reuse.

Another advantageous embodiment provides for a hand guard. This hand guard made, for example, of slotted plastic, prevents damage to the filter insert when it is installed.

Another advantageous embodiment provides for the end of the filter insert remote from the clean air end to have tolerance lips by means of which a secure seating in the housing is assured. The tolerance lip permits, within its geometric possibilities, a certain axial equalization and provides for a certain pressing of the end of the filter insert against the central tube.

In an additional advantageous embodiment there exists an air filter which contains an air filter element according to one or more of the above-stated claims. In this embodiment an air filter element described above is urged with its clean air outlet against a sealing surface of the air filter containing a clean air outlet, e.g., by means of a snap lever. The longitudinal forces thus produced are taken up by the housing of the air filter element. The central tube in the housing absorbs any transverse forces that occur, so that the filter element is mounted in the housing of the air filter element alnost without the application of any force.

These and other features of preferred embodiments of the invention will be found not only in the claims but also in the description and the drawings, it being possible for the individual features to be realized individually or together in the form of sub-combinations in the embodiment of the invention and in other fields, and can be advantageous as well as independently patentable embodiments for which protection is hereby claimed.

Embodiments of the invention are represented in the drawings and are explained herewith.

Figure 2:
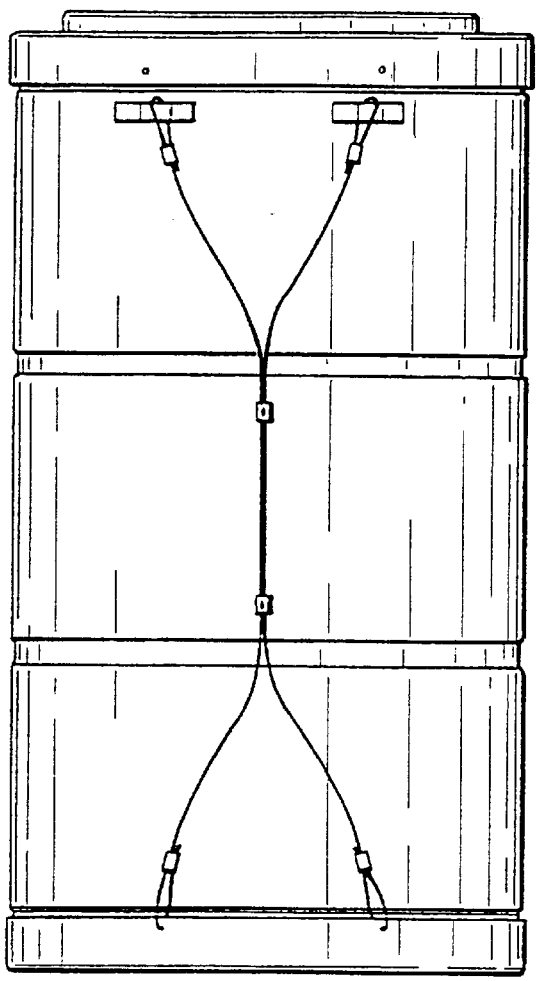
Figure 3:
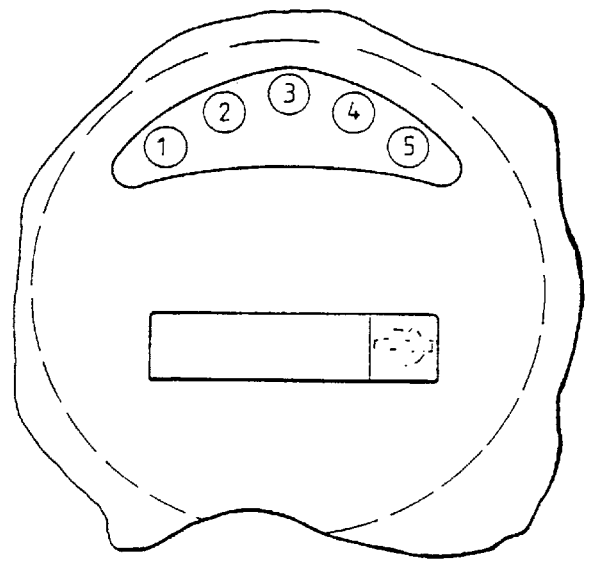

The drawings show:

FIG. 1 an air filter element,

FIG. 2 a carrying and installation handle on the air filter element,

FIG. 3 a maintenance interval unit.

The air filter element consists of a housing 1 which is divisible into two parts. The housing 1 is permeable to air, for example through the holes made on the circumference which constitute the raw air inlet 2. The clean air outlet 3 is integrated in the housing half 9. In the interior of the housing 1 is a likewise air-permeable central tube 4 which is connected to the clean air outlet 3. This junction can be cemented, welded, screwed or snapped together.

A metal-free filter insert 5 of pleated paper is slipped over the central tube 4. With PUR gaskets on the ends of the filter insert 5 the filter insert separates the clean air side from the raw air side. On the end facing away from the clean air side a PUR gasket extends over the entire end face and serves not only for sealing but also for the axially tolerant fixation of the filter insert 5 in the housing 1. In the housing half 9 there is an axial gasket 8 for sealing contact with the air filter. The filter insert 5, which is seated removably on the central tube 4, has a hand guard, preferably of slitted plastic, drawn over its outer surface. In less rough use this can be omitted.

For easier installation and removal and for the secure and leak-proof operation of the air filter element, the filter insert has a radially acting seal 6 which guarantee this in connection with end 7 and tolerance lips 10.

In one embodiment the two housing halves are screwed together, but a bayonet or snap fastening or a hook fastening is conceivable. As shown in FIG. 2, a handle is fastened to the air filter element, by means of which the air filter element is easier to manipulate, especially when it is inserted into the air filter, when the air filter element is held by the handle against the sealing surface of the air filter containing a clean air outlet, until the housing of the filter element is fixed in place with a quick acting lever, for example, which is not shown.

In one embodiment a maintenance indicator is represented, as it can be seen in FIG. 3, by means of which the maintenance interval can be read, for the manufacturing and sale date indicated thereon, for example. On the basis of the dust loading related to specific use in relation to running time, it is possible to make a prediction concerning the possible dust loading in proportion to the time the filter element has been in the air filter.

In an alternative embodiment the air filter element is provided with a catch means which can join the housing halves together and is connected to the cover or housing by a film hinge or a pinned hinge.

In an additional alternative embodiment a safety cartridge is held within the central tube, which is provided additionally in order to prevent contamination while the filter insert is being changed; it is closed at its end opposite the clean air outlet and is removably connected to the central tube. A hand guard is provided or slipped over the periphery of the filter insert and can consist of slitted plastic film.

What is claimed is:

1. An air filter element comprising a substantially cylindrical housing having an air-permeable circumferential surface defining a raw air inlet through which unfiltered air is admitted to the filter element and a clean air outlet disposed substantially coaxially on a first axial end of the cylindrical housing, an air-permeable central tube communicating with the clean air outlet and extending into the interior of the housing, a substantially metal-free filter insert slid over said central tube, said filter insert separating an annular raw unfiltered air space from a central clean air space, a second axial end of said filter element being closed; and an axial gasket at said first axial end of said housing; said housing further comprising first and second axially alianed housing parts.

2. An air filter element according to claim 1, wherein said central tube is joined to one of said first and second housing parts.

3. An air filter element according to claim 1, wherein said filter insert is releasably affixed to said central tube.

4. An air filter element according to claim 1, wherein an end of the filter insert facing said clean air outlet is provided with a sealing bead in sealing contact with and forming a radial seal with an outer circumferential surface of said central tube.

5. An air filter element according to claim 1, wherein an end of the filter insert facing the clean air outlet is provided with a sealing bead in sealing contact with and forming an axial seal with an axial end of the housing half.

6. An air filter element according to claim 1, wherein the filter insert comprises a pleated paper or fleece cylinder and end plates and a sealing bead of a polyurethane resin foam.

7. An air filter element according to claim 1, wherein the cylindrical housing, central tube, and axial gasket are reusable.

8. An air filter element according to claim 7, wherein the reusable parts are formed of at least one material selected from the group consisting of metals and synthetic resins.

9. An air filter element according to claim 1 wherein said second end of the filter insert is provided with resilient tolerance lips.

* * * * *